US012775899B1

(12) United States Patent
Shridhar

(10) Patent No.: US 12,775,899 B1
(45) Date of Patent: Oct. 27, 2026

(54) LARGE HIERARCHY NODE DYNAMICALLY GENERATED DATA FRAMEWORK

(71) Applicant: SAP SE, Walldorf (DE)

(72) Inventor: Archana Shridhar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/279,290

(22) Filed: Jul. 24, 2025

(51) Int. Cl.
*G06Q 10/06* (2023.01)
*G06Q 10/067* (2023.01)

(52) U.S. Cl.
CPC .................................. *G06Q 10/067* (2013.01)

(58) Field of Classification Search
CPC ............. G06Q 10/067; G06Q 10/0672; G06Q 10/0674
See application file for complete search history.

(56) References Cited

U.S. PATENT DOCUMENTS

2016/0103912 A1* 4/2016 Daggett ................. G16H 50/70 707/736
2022/0308985 A1* 9/2022 Sariel .................... G06F 11/323

* cited by examiner

*Primary Examiner* — Loc Tran
(74) *Attorney, Agent, or Firm* — Buckley, Maschoff & Talwalkar LLC

(57) ABSTRACT

According to some embodiments, systems and methods are provided including generating a first visualization based on a model; receiving a note on a first visualization data element; storing the received note with a path; generating a second visualization based on the model, the second visualization including a second visualization data element corresponding to the first visualization data element; generating, via execution of a member list instruction, a member list of note candidate members; determining a volume of note candidate members in the member list; selecting a path component based on the determined volume; executing the selected path component and outputting the path for each note candidate member in the generated member list; and rendering the note on the second visualization in a case the path for a first note candidate member in the generated member list matches the path stored with the received note. Numerous other aspects are provided.

16 Claims, 10 Drawing Sheets

200

202

| ID | Description | Hierarchy |
|---|---|---|
| ALL_PRODUCTS | All Produccts | <root> |
| HPRD0001 | Apparel | ALL_PRODUCTS |
| HPRD0002 | Footwear | ALL_PRODUCTS |
| newmember3 | newmember3 | HPRD0002 |
| Not in Hierarchy | Not in Hierarchy | <root> |
| PRD0001 | Athletic Shirts | HPRD0001 |
| PRD0002 | Athletic Shorts1 | HPRD0001 |
| PRD0003 | Tennis Shoes | HPRD0002 |
| PRD0004 | Running Shoes | HPRD0002 |

500 502 504

```
SELECT PATH, ${queryNodeNameColumn} FROM $ {tableName} WHERE QUERY_NODE_NAME in
(${member list}) ORDER BY $ {orderColumn}
```

FIG. 5A 525 504

```
SELECT PATH, ${queryNodeNameColumn} FROM $ {tableName} WHERE QUERY_NODE_NAME in
(SELECT MEMBER_ID FROM ${sTempTable}) ORDER BY $ {orderColumn}
```

520

FIG. 5B 550 504

```
SELECT PATH, ${queryNodeNameColumn} FROM $ {tableName} WHERE QUERY_NODE_NAME in
(PreparedStatement1 INTERSECT PreparedStatement2) ORDER BY $ {orderColumn}
```

418

FIG. 5C

600

| | PATH PROCESS COMPONENT (602) | OVER THE RANGE LIMIT (601) | USES TEMPORARY TABLE (601) | USES MEMBERS (601) | USES QUERY (601) |
|---|---|---|---|---|---|
| 604 | Member | N | N | Y | N |
| 606 | Temporary Table | Y (slightly higher) | Y | N | N |
| 608 | Passing-back | Y (much higher) | N | N | Y |

FIG. 6

LARGE HIERARCHY NODE DYNAMICALLY GENERATED DATA FRAMEWORK

BACKGROUND

Organizations collect and store large sets of data. The organizations then use applications to help understand that data, via analysis, predictions, planning and reporting. The applications may include features like reports, dashboards, data exploration, data preparation and visualizations such as charts, tables and other visual formats to display data in a way that can be quickly and easily understood. These features play a central role in discovering unseen patterns in the data, which may help the organization. To that end, it may be helpful for users to collaborate across these features via comments. Comments help in collaboration because users may find certain insights in the data, and they then may add their insights as comments (notes) to the features to be viewed by other users.

Users may create a data model to analyze the data and then may create different visualizations from the data model, the visualizations representing different aspects. For example, for a profit and loss model, one visualization represents profits by account while another visualization represents profits by product type. The data model often contains a selection of measures and attributes. Attributes (e.g., product name, category, country, year, supplier, etc.) are descriptive elements that provide context for a measure. A measure is a numeric value, such as a price or quantity, on which arithmetic or statistical operations (e.g., quantity, sales revenue) can be processed. A dimension is a group of related attributes. Non-exhaustive examples of dimensions are account, time, region, product, currency, etc. For the non-exhaustive product dimension example, various related attributes of product category and product may be included. Dimensions are re-usable objects that can be used to develop data models. The model may contain multiple dimensions.

Comments ("notes") on the different visualizations created for the data model are conventionally stored against the context in which they are generated. Contexts are used to show the place of values in a structure, with values (e.g., members/data elements) having the same parent node being in the same context. The context includes the dimensions and the dimension members that participated to make the values for the visualization. Context refers to the specific data, dimensions and filters that are currently applied in the view/visualization, and determines what data is being analyzed and how it is being presented. Often a comment made against a particular set of dimensions in a first visualization should be displayed/visible in other visualizations including hierarchies that contain the same members of those particular sets of dimensions. As such, a data cell whose data aggregation is formed based on a same set of filters and dimension coordinates will have an equivalent set of comment context for the involved dimensions and its members. A hierarchy is a structured representation of a dimension. The different levels in the hierarchy may be referred to as nodes or members, and a leaf node refers to the lowest level in the hierarchy that does not have any child nodes. The leaf node is not a dimension itself, but rather a member within a dimension that does not have any further subdivisions. As a non-exhaustive example, consider a hierarchical dimension like "Geography" with members/levels such as "Country," "State" and "City", a city like "New York" is a leaf node because it doesn't have any further subdivisions within this hierarchy.

For a given dimension member/node in a datapoint coordinate, the effective members contributing to the data cell may be decided by filter selections. There may be multiple levels of filters set for a same dimension in different visualizations, with the complexity increasing when each filter has members selected from different hierarchies. As a non-exhaustive example, a model may have a "Products" dimension and a first visualization may have all products (e.g., apparel and footwear) displayed, while a second visualization may have a filter applied such that only apparel is displayed.

In response to a request to display already stored comments (e.g., comments on the first visualization) on a new visualization (e.g., the second visualization), the conventional comment display process determines whether hierarchies of the new visualization match the hierarchies of the first visualization in which the comment was made. To determine the match, the values/members of the hierarchy are checked one-by-one. In the case of a match, the comment is displayed. However, this checking process presents a challenge when there is a high volume of members for a given parent node. In particular, this high member volume causes low performance for the database performing the matching and leads, undesirably, to high CPU and memory consumption for the database.

Systems and methods are desired for improving the efficiency with which comments may be retrieved for use in other visualizations. Improving this efficiency may effectively increase the capacity of the application to respond to any requests.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 5A, 5B and 5C are path queries according to some embodiments.

FIG. 6 is a rules table according to some embodiments.

Figure 1:
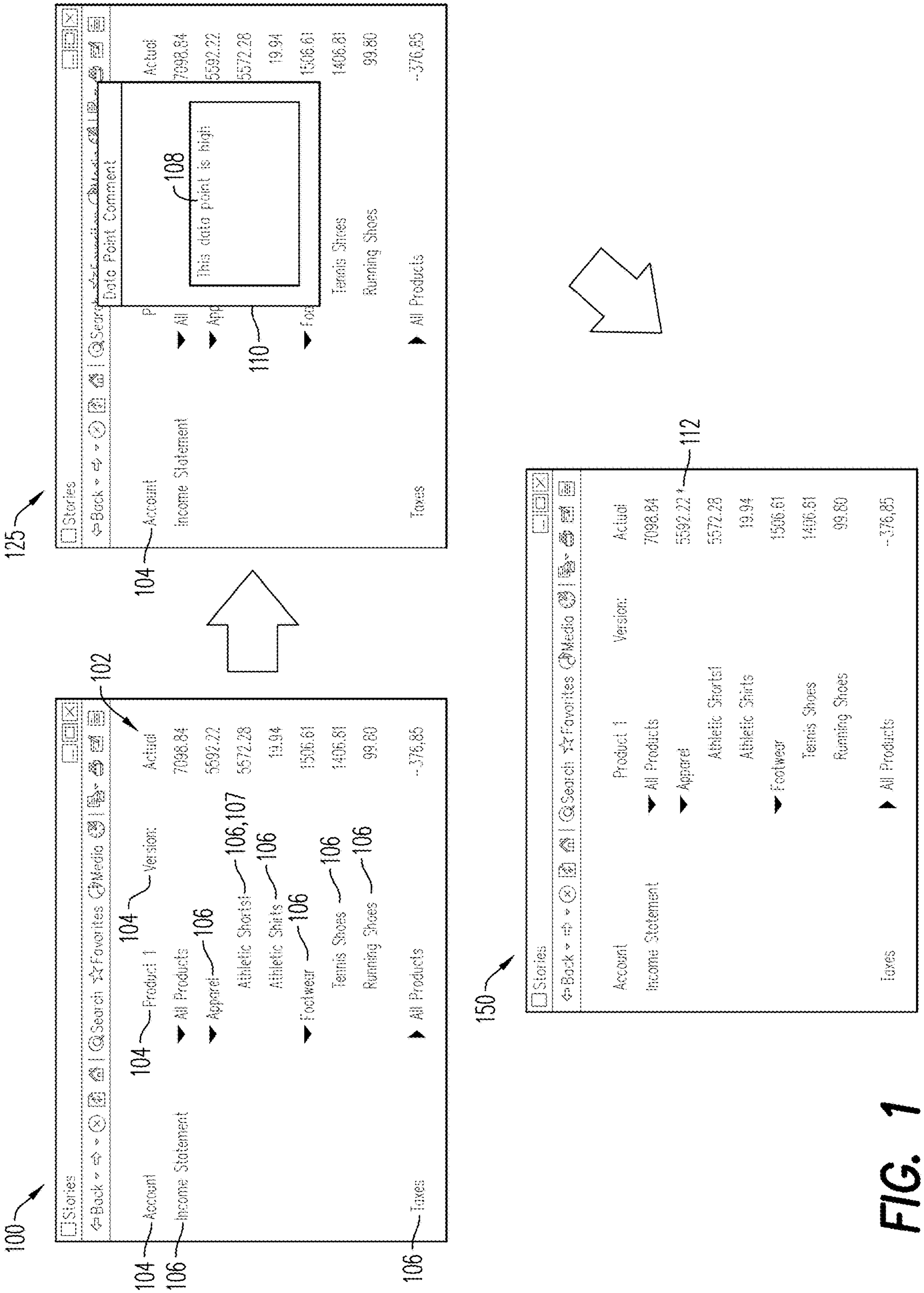
FIG. 1 is a user interface including a visualization receiving a comment.

Throughout the drawings and detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, a user may use an application to create a data model that represents particular data of the organization, the data using common terminology. The model may have a structure that includes one or more dimensions, and in some cases one or more measures. Each dimension may have members and hierarchies, and attributes defined for the dimensions. In some cases, the model may include calculations. Data may be imported to the model and exported from the model. After the model is created, and data imported, the user may want to see a visual representation of the data or want to show it to someone else. The visualization may be referred to as a story or report. The visualization may be in the form of charts, tables, geo maps, etc. While a table is the non-exhaustive example used herein, embodiments include other visualizations.

Turning to FIG. 1, a non-exhaustive example of three user interfaces 100, 125, 150, each including a table 102 for a first model are provided. Here, in the first user interface 100, the table 102 includes an account dimension 104 with members 106 Income statement and Taxes; and a product dimension 104, with members 106, apparel, athletic shorts1, athletic shirts, footwear, tennis shoes and running shoes. Of those members, athletic shorts1, athletic shirts, tennis shoes and running shoes are leaf nodes 107, while apparel and footwear are parent nodes (or sub-parent nodes). It is noted that in some instances, in a case a parent node has only one child node, the parent and child's leaf nodes are the same. During review of the visualization, a user may add a comment ("note") 108 to the table via a comment window 110 as shown in the second user interface 125. Conventionally, the comment 108 is saved with the context for the visualization. The comment context is all the children, or the lower most children in the hierarchy coming under a particular parent where the comment is placed. All of those children together form the context for the comment. Here, in the third user interface 150 the comment is on the apparel node, as indicated by a comment indicator 112, and the context (the members having the same parent node) is the athletic shorts 1 leaf node and the athletic shirts leaf node for the products dimension.

Figure 2:
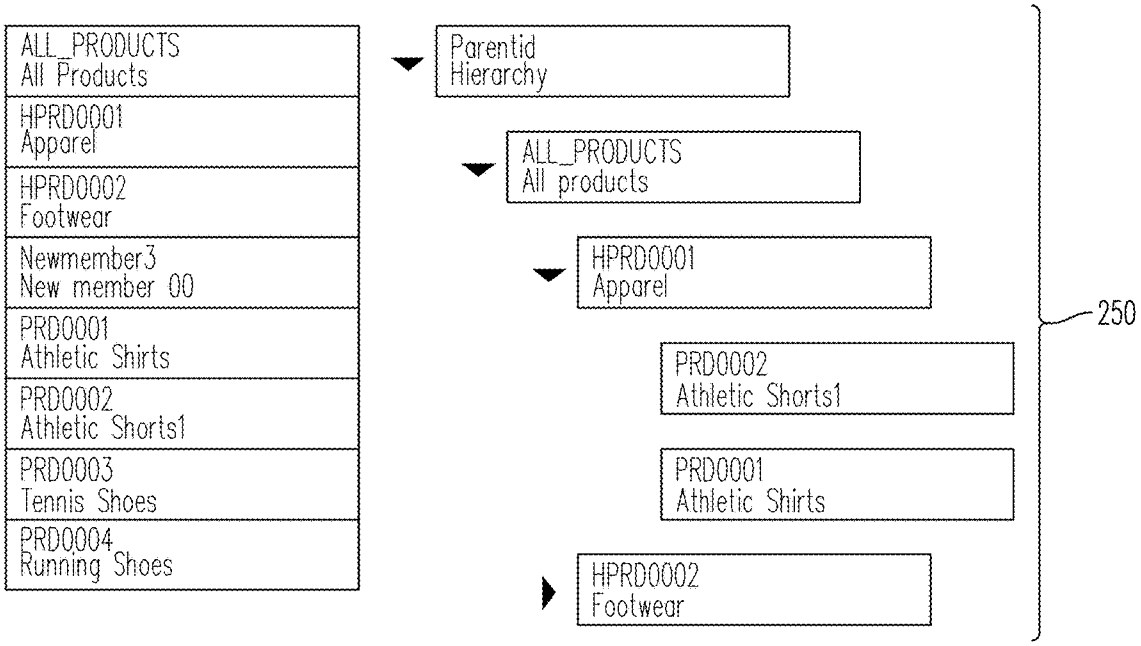
FIG. 2 is a model and hierarchy of the visualization in FIG. 1.

FIG. 2 is a non-exhaustive example of model 200 for the table in 102 in FIG. 1, showing how the hierarchy is being defined for a given dimension. The table 202 includes the definition. Here, the model 200 is for the product dimension. The product dimension itself is a table in the backend and includes hierarchy information as part of the different views for this dimension table. The model 200 is shown herein as the table. For each entry, the table includes an ID, a description and a hierarchy position per the model. Here, the model 200 shows for an ID and description of "All Products", the hierarchy position of "root"; for ID HPRD0001, and description "Apparel", the position is a child of "All Productions"; for ID HPRD0002, and description "Footwear", the position is a child of "All Productions; for ID PRD0001, and description "Athletic Shirts", the position is a child of HPRD0001, which has a description of "Apparel"; for ID PRD0003, and description "Athletic Shorts1", the position is a child of HPRD0001, which has a description of "Apparel; for ID PRD0003, and description "Tennis Shoes", the position is a child of HPRD0002, which has a description of "Footwear"; and for ID PRD0004, and description "Running Shoes", the position is a child of HPRD0002, which has a description of "Footwear".

A structural view 250 of the model 200 is also provided herein. In the structural view, parent "All Products" has sub-parent "HPRD0001-Apparel", which has children of "PRD0002-Athletic Shorts1" and "PRD0001-Athletic Shirts". Additionally, parent "All Products" has sub-parent "HPRD0002-Footwear".

In a case visualizations are saved with different hierarchies (e.g., after application of a filter), another column may be included for that different hierarchy.

Figure 3:
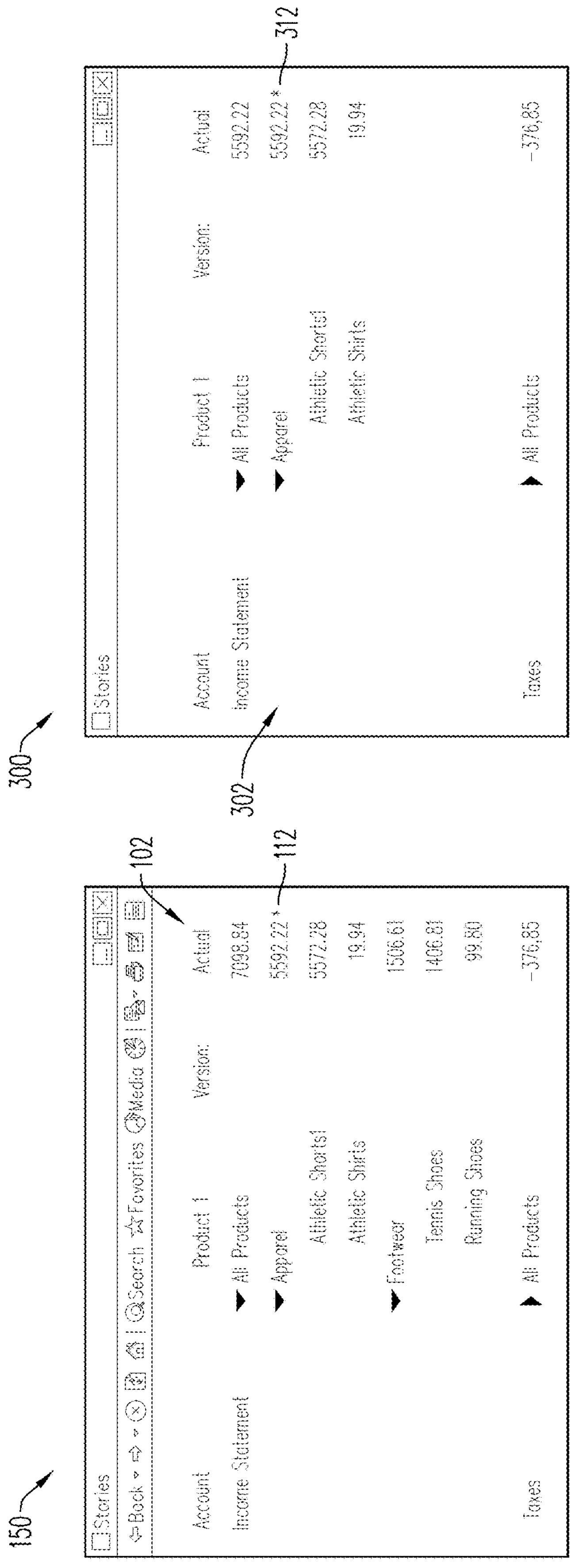
FIG. 3 is a user interface display including 2 visualizations.

FIG. 3 is a non-exhaustive example of the user interface 150 of FIG. 1 including the table 102 and a user interface 300 including a second table 302 for the first model. The second table 302 represents a different view of the data of the first model. In this non-exhaustive example, the first table 102 represents the data based on the "all product" hierarchy, while the second table 302 represents the data based on a filter having been applied to limit the data to "Apparel". Conventionally, the comment process to render the comments on the second table 302 includes first retrieving all of the stored comments saved for the model across all visualizations (e.g., the comment shown in FIG. 1, for the first table, and comments for any other visualization created for the first model.). Here, the comment is the comment 108 on the "Apparel" parent node indicated by comment indicator 112. Second, the conventional comment process fetches the context for each stored comment. The context for the stored comment may be referred to as the "writer's context." Here, the writer's context is "Athletic Shirts" and "Athletic Shorts1" because they are contributing to the parent "Apparel" in the table 102. Third, the conventional comment process determines whether the writer's context matches a reader's context. The reader's context is the context for the visualization (e.g., new visualization (second table 302)) that may receive the comment if there is a match. A reader's context is determined before there can be a determination of a match between a reader's context and a writer's context. Here there's one reader's context: Athletic Shirts, Athletic Shorts1. The conventional comment process takes each comment stored in the database for this model and fetches its stored comment context (referred to as the writer's context) and tries to match it against each reader's context, one-by-one. For example, for the writer's context including Athletic Shirts and Athletic Shorts1, for a first comment the process asks: "Does the reader's context (Athletic Shirts and Athletic Shorts1) have Athletic Shirts?" If not, the process moves on to another reader's context. In this case, however, the reader's context does have Athletic Shirts, so the process moves on to check the next node (Athletic Shorts1) in the reader's context. If the next node in the reader's context is Athletic Shorts 1, then there may be a match. The process moves on to check for any other nodes in the reader's context. The process concludes that there is a match in this example because the apparel context including Athletic Shirts and Athletic Shorts1 members matches the reader's context with no other nodes present, so the comment from the first table 102 is displayed on the second table 302, as indicated by comment indicator 312.

To determine the reader's context, a path query is executed for the members. The challenge with conventional comment processes is when there is a high volume of members for a given parent node. The high volume leads to low performance for the path query due to the large range of member values input in a "WHERE" condition of the path query. Execution of the path query with high volume also leads to high CPU and memory consumption for the database executing the query. This is particularly problematic as databases often have limits on the number of values that can be passed in the "WHERE" clause. As a non-exhaustive example, for SAP's S/4 HANA®, the limit is 65K. As such, if there are more than 65,000 members being input to the "WHERE" clause of the path query, the query will fail with a numeric out of range error.

To address these problems, a large data volume hierarchy framework provides for the determination of a volume of members for which a context/path is to be determined. The path represents the hierarchy/structure from the root to reach that particular member. One of three different processes, based on the determined volume, is executed to execute the path query. Each of the different processes includes different data in the "WHERE" condition of the path query. Pursuant to embodiments, the framework or system first identifies effective members as a "member list". The member list includes an array of members output from an intersection of the members included for a given parent node in the hierarchy of the first table (the table in which the comment originated) and the members for the parent nodes in the hierarchies of the second table (the table that may have the comment applied thereto). The volume of effective members in the member list is generated. One or more rules are applied to the generated volume to determine which process to execute to generate the path. The rules may include threshold values and/or other suitable rules. Embodiments provide a unique solution with respect to optimization of runtime memory and CPU consumption for path queries that involve a large volume of member values. Embodiments may be applicable to any dynamic query that results in a large volume of values which is beyond a database limit if used directly.

Figure 4:
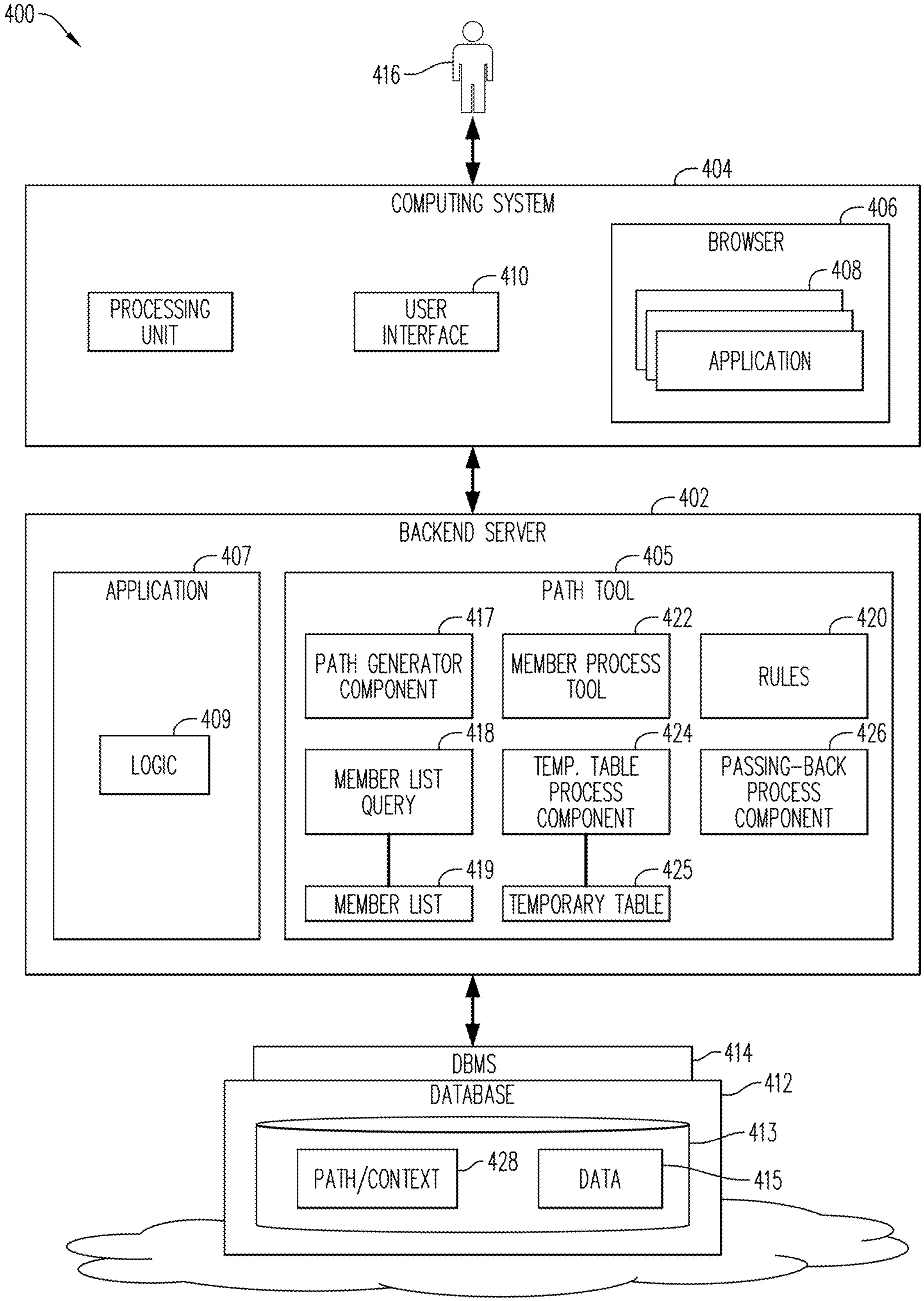
FIG. 4 is a block diagram of an architecture according to some embodiments.

FIG. 4 is a high-level block diagram of a large data volume hierarchy framework or system architecture 400 according to some embodiments. The illustrated elements of system architecture 400 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 400 are implemented by a single computing device, and/or two or more elements of system architecture 400 are co-located. One or more elements of system architecture 400 may be implemented using cloud-based resources, and/or other systems which apportion computing resources elastically according to demand, need, price, and/or any other metric. One or more components may be implemented as a cloud service (e.g., Software-as-a-Service, Platform-as-a-Service).

System architecture 400 includes backend server 402, a path tool 405, a local computing system 404 including a browser 406 running a client application 408 and user interface 410. System architecture 400 also includes a database 412, a database management system (DBMS) 414 and a client/user 416. As used herein, the terms "client, "user" and "end-user" may be used interchangeably.

The backend server 402 may include server applications 407 and the path tool 405. Server applications 407 may comprise server-side executable program code (e.g., compiled code, scripts, etc.) executing within the backend server 402 to receive queries/requests from clients/users 416, via the local computing system 404, and provide results to clients/users 416 based on data of the database 412 and application logic 409. Logic 409 of the application 407 may comprise program code to provide functionality to users 416. The functionality may comprise any functionality that is or becomes known, and providing such functionality may require access via DBMS 414 to data 415 stored in storage device 413 of database 412.

The path tool 405 includes a path generator component 417, a member list query 418, rules 420, a member process 422, a temporary table process 424, and a passing-back process 426. As used herein, the terms "member list query" and "member list instruction" may be used interchangeably.

Pursuant to some embodiments, after the second report is designed (e.g., the dimensions and/or filters are selected), the user may select a user interface button (e.g., a save button, a generate report button, etc.) and a path generator component 417 of the path tool 405 generates a path 428 for each data element in the second visualization. As used herein, the terms "path" and "context" may be used interchangeably. The path generator component 417 generates the paths via any suitable path generation process. The generated paths 428 are stored in the database 412.

The member list query 418 is a query to identify the members ("comment/note candidate members") in the intersection of two or more prepared statements. The comment candidate members may be included in a member list 419 member list = *PreparedStatement*1 INTERSECT *PreparedStatement*2

Execution of the member list query 418 returns the members for the given parent node that are common among the hierarchy of each visualization. As described above, the dimension has a table in the backend with hierarchy information as part of the different visualizations for this dimension table. The query is executed based in part on the hierarchy in which the comment was made. A prepared statement is generated for each hierarchy. The prepared statement is a pre-complied, parameterized Structured Query Language (SQL) statement designed for enhanced efficiency and security when executing repetitive queries. With a regular query, each time a regular SQL query is sent to the database, the database needs to parse, analyze, validate, optimize (create a query plan), and then execute the statement. The whole process happens for every execution. With a prepared statement, the prepared statement is sent to the database once as a template with placeholders for varying values (often denoted by "?"). The database precompiles this template, creating an optimized query plan. Subsequent executions only require sending the data values to fill the placeholders, by-passing the parsing and optimization steps. A benefit of using prepared statements instead of a regular query, as in one or more embodiments, is that prepared statements offer strong protection against SQL injection attacks. Since the SQL logic is separated from the data provided by the user (sent later via a different protocol), malicious input cannot be interpreted as SQL commands.

Application of the rules 420 determines which path process to execute with respect to a path query (FIGS. 5A, 5B, 5C). The path query 500 (FIG. 5A) and other queries described herein may be in a Structured Query Language (SQL) format or other suitable format. As used herein, the terms "path query" and "path statement" may be used interchangeably. Embodiments execute the path query for a given view to select a path for each member in the member list 419. The path query 500 (FIG. 5A) is:

SELECT PATH, $ {queryNodeNameColumn} FROM $ {tableName} WHERE QUERY_NODE_NAME in ($ {member list}) ORDER BY $ {orderColumn}

The path query 500 specifies the column (e.g., a query node name column) in a given table (table Name) from which the data values (e.g., generated path per the member list) are to be retrieved.

FIG. 5A includes the path query 500. The path query 500 includes at least a "WHERE" clause 502 and an "in" operator 504. As described above, each database has its own limit on the number of values that can be passed in the "WHERE" clause 502 of the path query 500. In some cases, the limit is 65K, so if there are more than 65,000 members in the member list 419, the path query 500 will fail or the database will crash.

It is noted that the member list query is a direct query (e.g., there is no "in" operator in the prepared statement), meaning the member list query is not subject to the database limits, unlike the path query.

FIG. 6 includes a rules table 600 including one or mor rules 601. The rules indicate which path process component 602 to execute via the path tool 405. As described above, the path process component 602 is one of a member process component 604, a temporary table process component 606 and a passing-back process component 608.

For the member process component 604, and per the rules table 600, the path tool 405 executes the member process component 604 in a case the volume of members in the member list 419 is not over the range limit. Execution of the member process component 604 inputs the members from the member list 419 into the path query 500 following the "in" operator 504.

For the temporary table process component 606, and per the rules table 600, the path tool 405 executes the temporary table process component 606 in a case the volume of members in the member list 419 is over the range limit, but within a given pre-defined threshold. Continuing with the above example having the limit of 65K, in a case the members in the member list 419 is 80K, the path tool 405 executes the temporary table process component 606. Execution of the temporary table process component 606 includes the automatic creation of a temporary table 425 and insertion of all of the members of the member list 419 into the temporary table 425 via execution of a create and insert function. After the temporary table 425 is created and populated with the members of the member list 419, the path tool 405 uses a SELECT query 520, listing the temporary table following the "in" operator 504 of the path query 525, as shown in FIG. 5B. Use of the temporary table process component 606 avoids sending all of the comment candidate members explicitly in the WHERE clause and thereby avoids exceeding the database limit.

For the passing-back process component 608, and per the rules table 600, the path tool 405 executes the passing-back process component 608 in a case the volume of members in the member list 419 is over the range limit and exceeds a pre-defined threshold. Continuing with the above example having the limit of 65K, in a case the members in the member list 419 is 300K, the path tool 405 executes the passing-back process component 608. Execution of the passing-back process component 608 includes the use of the member list query 418 in the path query 550 following the "in" operator 504, as shown in FIG. 5C. It is noted that although the member list 419 is dynamically generated, by passing back the original statements and their associated placeholder values, the path tool 405 is able to quickly select the path, without negatively impacting the database memory and CPU utilization. The passing-back process component 608 pushes the logic to the database layer itself by asking the database to run the member list query and passes the output of that query to the path query, making the passing-back process component 608 better than passing the many values directly to the path query.

As described above, after the paths for the members are retrieved, the retrieved paths are compared to the stored comment paths/contexts to identify any matches. In a case of the match, the comment is returned to the second visualization.

The backend server 402 may provide any suitable interfaces through which clients/users 416 may communicate with the applications 407/408 executing thereon. The backend server 402 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface. Backend server 402 may be separated from or closely integrated with DBMS 414. A closely-integrated backend server 402 may enable the execution of applications 407 completely on the database platform, without the need for an additional server. For example, backend server 402 may provide a comprehensive set of embedded services which provide end-to-end support for Web-based applications. Backend server 402 may provide application services (e.g., via functional libraries)

which applications 407 may use to manage and query the database files stored in the database 412. The application services can be used to expose the database data model, with its tables, hierarchies, views and database procedures, to clients/users 416. In addition to exposing the data model, backend server 402 may host system services such as a search service, and the like.

Generally, local computing system 404 executes one or more applications 408 to provide functionality to client/user 416. Applications 408 may comprise any software applications that are or become known, including but not limited to visualization applications including commenting functionality. As will be described below, applications 408 may comprise web applications which execute within a web browser 406 of local computing system 404 and interact with corresponding server applications 407 to provide desired functionality. The client application 408 may send a user interface request (or other suitable request) to a server-side or back-end application ("server application") 407 for execution thereof. For example, when a user clicks on a button or enters information via a UI of the client application 408, a request is sent to the backend server 402. The backend server then responds with what needs to be rendered/content that is then provided to the client application. The user 416 may interact with the resulting displayed user interface output from the execution of applications, to create further visualizations, reports, analyses, etc.

Presentation of a user interface as described herein may comprise any degree or type of rendering, depending on the type of user interface code generated by the backend server 402/local computing system 404.

In one example, user 416 may operate a user device (not shown) to execute a Web browser or another client application which provides access to user interfaces of application 408 via the computing system 404 and through a network (also not shown). User 416 submits a request to application 408 via such a user interface. The request may comprise a request to render comments based on data 415. In response, backend server 402 executes logic 409 to determine one or more queries of database 412 which are required to respond to the request. The queries are transmitted to database 412 via DBMS 414 and corresponding result sets are received from database 412. Logic 409 uses the result sets to formulate a response to the original request and returns the response to the computing system 404. The computing system 404 displays the response for the user 416.

Database 412 may comprise any query-responsive system for data storage and retrieval that is or becomes known. Database 412 may be cloud-based, and/or distributed. Storage device 413 may comprise one or more solid state and/or platter-based fixed disks, non-volatile random-access memories, etc. Data 415 may include database tables conforming to one or more database schemas, in row-based, column-based or other formats.

DBMS 414 serves requests to store, retrieve and/or modify data of database 412, and also performs administrative and management functions. Such functions may include snapshot and backup management, indexing, optimization, garbage collection, and/or any other database functions that are or become known. DBMS 414 may also provide application logic, such as database procedures and/or calculations, according to some embodiments. This application logic may comprise scripts, functional libraries and/or compiled program code. DBMS 414 may comprise any query-responsive database system that is or becomes known, including but not limited to a structured-query language (i.e., SQL) relational database management system.

System architecture 400 may comprise any number of unshown hardware and software components, including, but not limited to, gateways, routers, redundant components, etc.

Figure 7:
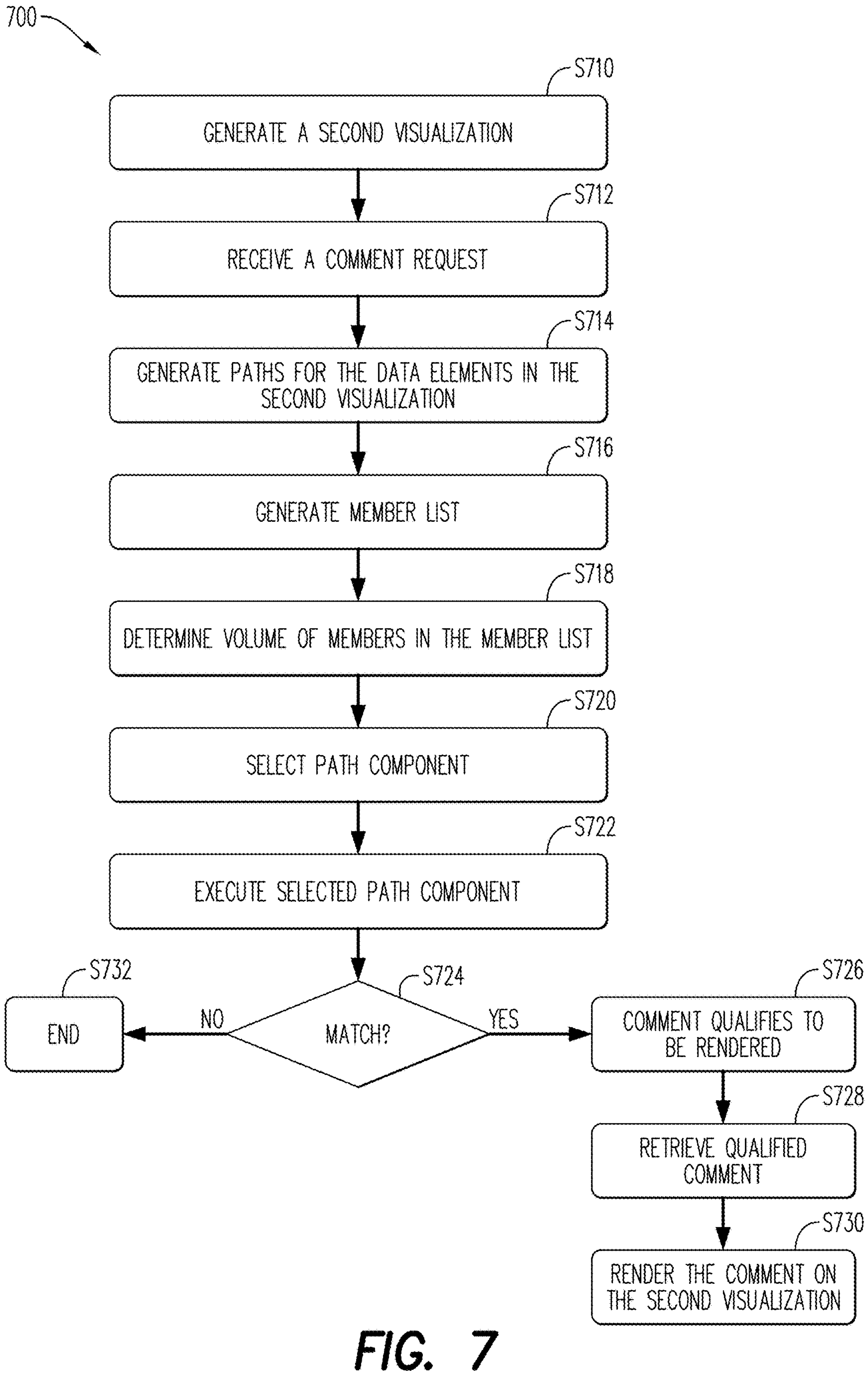
FIG. 7 is a flow diagram of a process according to some embodiments.

FIG. 7 illustrates a process 700 to determine whether a comment on a prior visualization should be rendered on a new visualization according to some embodiments. The process 700 and other processes described herein, may be performed by a database node, a cloud platform, a server, a computing system (user device), a combination of devices/nodes, or the like, according to some embodiments. In one or more embodiments, the system architecture 400 may be conditioned to perform the process 700, and other processes described herein, such that a processing unit 1035 (FIG. 10) of the system architecture 400 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 8:
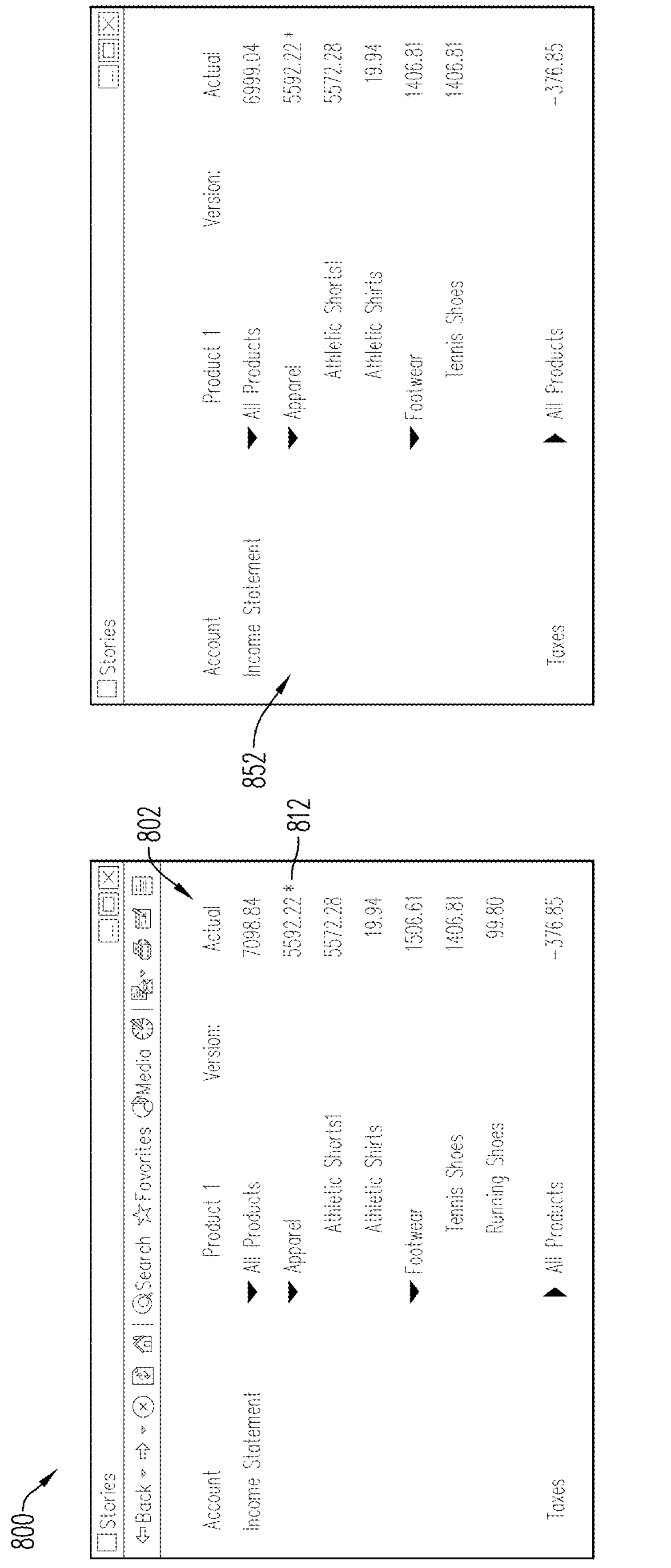
FIG. 8 is a non-exhaustive example of a user interface including two visualizations according to some embodiments.

Prior to the start of the process, a user has logged-in to a visualization application and created the table visualization ("report") 802 displayed in the UI display 800 of FIG. 8, for data of a data model, and has added a comment to a data element of the visualization, as indicated by comment indicator 812. The data model has a structure including a level-based hierarchical structure organizing multiple dimensions into levels and shows the number of members and parent-child hierarchies in each dimension and is stored as data 415. The comment is saved with a path 428 via selection of a user interface element (e.g., save button (not shown)). Initially, when the first visualization is loaded, all the members are included, but when saving a comment on a particular data point, only a few members are associated with that context.

Initially, at S710, a second visualization 852 (FIG. 8) is generated based on the data model, as shown in the user interface 800 of FIG. 8. As compared to the first visualization 802, the second visualization has had a filter applied to "Footwear" to limit "Footwear" to only "Tennis Shoes". Application of the filter has resulted in a change in the "All Product" value and the "Footwear" value. A request (and initiation of the process 700) is received for rendering available stored comments ("comment request") on a data point of the second visualization in S712 via selection of a user interface element of the visualization application. The request includes one or more data elements of the second visualization 852 and an indication of the hierarchy in the second visualization (e.g., including any filters). Available stored comments are those for which a match is found per S724. The request for rendering available stored comments may be received in response to selection of a "Show Comments" user interface element (not shown) or via any other suitable process (e.g., selection of a "Generate visualization" user interface element (not shown)). In response to the selection, paths are generated for data elements rendered on the second visualization in S714. In a case this second visualization was previously saved, the paths were previously generated for this second visualization upon saving of the second table. In a case this second visualization was not previously saved, the path is generated via the path generation component 417, as described above.

Then, at S716, the member list 419 is generated for the second visualization. Pursuant to embodiments, the path tool 405 receives the comment request and executes the member list query 418. The generated member list 419 includes the effective members for which there is an intersection of members for the saved hierarchies (e.g., previously saved reports) of the model. While in this non-exhaustive example there is only one previously saved report, the member list query 418 may generate a member list 419 for the intersection of members of all saved hierarchies for the model.

After the member list 419 is generated, a volume of members in the member list 419 is determined in S718. The volume of members may be determined via execution of a counting algorithm or other volume measurement process.

Then, in S720, the path tool 405 selects a path component 602 from one of: member process component 604, a temporary table process component 606 and a passing-back process component 608. As described above, the path tool 405 applies one or more rules 601 from the rules table 600 to the determined volume of members, and outputs a selected path component 602.

The path component 602 is executed in S722, and a path for each effective member in the generated member list 419 is selected. As described above, the path represents the hierarchy/structure from the root to reach that particular member.

Each selected path is compared to the path for the data element on which the comment is attached ("comment path") in the first visualization 802. The path tool 405 determines, based on the comparison, in S724 whether the selected path matches the comment path. In a case a match exists, the comment qualifies to be rendered in S726.

The qualified comment is retrieved in S728, and then rendered on the second visualization in S730.

Continuing with the non-exhaustive example shown in FIG. 8, regarding the comment stored on the "Apparel" node in the first visualization 802, the path for the "Apparel" data element in the second visualization 852 is the same (matches) as the path for the "Apparel" data element in the first visualization 802. Because the paths match, the stored comment is retrieved and rendered on the table.

In a case a match does not exist at S720, the process 700 ends at S732 and the comment is not retrieved nor rendered on the second visualization 852.

It is noted that the non-exhaustive examples herein have few members for ease of explanation. In other non-exhaustive examples, the members list may include a million members and each needs to be analyzed to determine if the comment should be attached.

Figure 9:
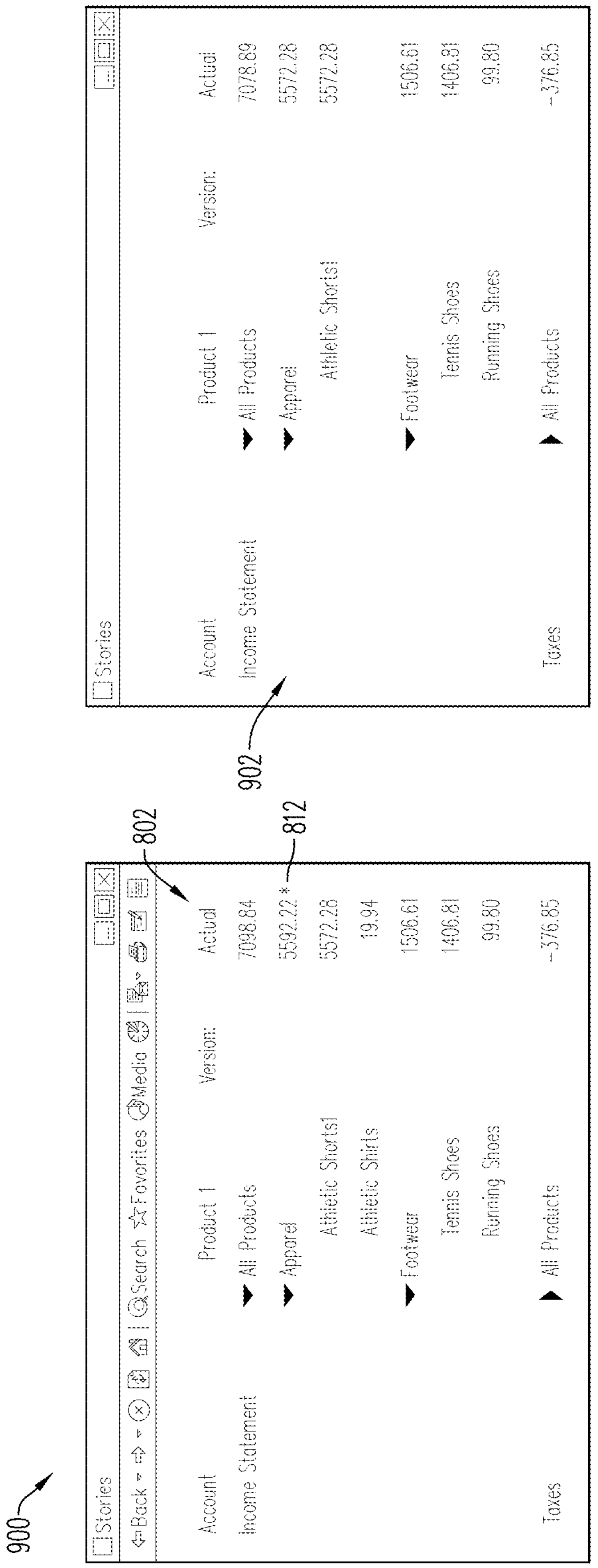
FIG. 9 is another non-exhaustive example of a user interface including two visualizations according to some embodiments.

FIG. 9 displays a user interface 900 including another non-exhaustive example. Here, the first visualization 902 is a table, having a comment added and saved as described above, displayed via indicator 912. The paths were generated and saved, as described above. A filter has been added and a second visualization 952 was generated. Here, the comment included in the first visualization 902 will not be included in the second visualization 952 because the path for the "Apparel" node in the first visualization 902 is different from the path for the "Apparel" node in the second visualization 952. The paths are different because there are different members contributing to the "Apparel". For example, in the first visualization 902, "Apparel" includes children "Athletic Shirts" and "Athletic Shorts1", and in the second visualization "Apparel" includes only one child-"Athletic Shorts1". The different paths mean there is no longer a match.

Figure 10:
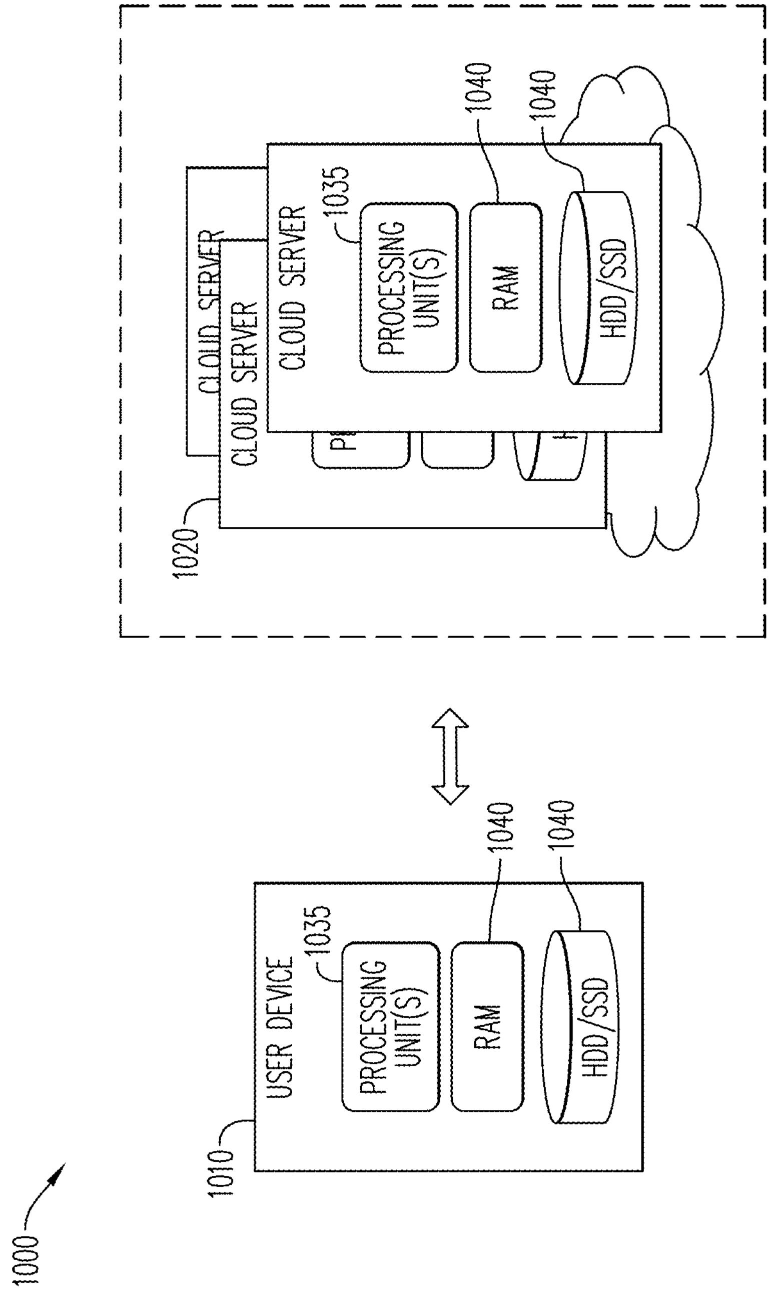
FIG. 10 is a block diagram of a cloud-based architecture according to some embodiments.

FIG. 10 illustrates a cloud-based database deployment 1000 according to some embodiments. The illustrated components may reside in one or more public clouds providing self-service and immediate provisioning, autoscaling, security, compliance and identity management features.

User device 1010 may interact with applications executing on the cloud server 1020, for example via a Web Browser executing on user device 1010, in order to generate a path query, retrieve paths and render comments on a user interface. Cloud server 1020 may comprise cloud-based compute resources, such as virtual machines, allocated by a public cloud provider. As such, cloud server 1020 may be subjected to demand-based resource elasticity. Each of the user device 1010, and cloud server 1020 may include a processing unit 1035 that may include one or more processing devices each including one or more processing cores. In some examples, the processing unit 1035 is a multicore processor or a plurality of multicore processors. Also, the processing unit 1035 may be fixed or it may be reconfigurable. The processing unit 1035 may control the components of any of the user device 1010 and cloud server 1020. The storage devices 1040 may not be limited to a particular storage device and may include any known memory device such as RAM, ROM, hard disk, and the like, and may or may not be included within a database system, a cloud environment, a web server or the like. The storage device 1040 may store software modules or other instructions/executable code which can be executed by the processing unit 1035 to perform the method shown in FIG. 7. According to various embodiments, the storage device 1040 may include a data store having a plurality of tables, records, partitions and sub-partitions. The storage device 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
- a memory storing executable program code; and at least one computing processor to execute the program code to cause the system to perform operations comprising:
- generating a first visualization based on a model;
- receiving a note on a first visualization data element;
- storing the received note with a path;
- generating a second visualization based on the model, the second visualization including a second visualization data element corresponding to the first visualization data element;
- generating, via execution of a member list instruction, a member list of note candidate members;
- determining a volume of note candidate members in the member list;
- selecting a path component based on the determined volume, wherein the path component is one of a member process component, a temporary table process component and a passing-back process component, wherein the path component determines an input following an "in" operator of a SQL path statement;
- executing the selected path component and outputting the path for each note candidate member in the generated member list; and
- rendering the note on the second visualization in a case the path for a first note candidate member in the generated member list matches the path stored with the received note.

2. The system of claim 1, wherein the path is a hierarchy of nodes for a data element.

3. The system of claim 2, wherein the path is defined by nodes contributing to the data element in a given visualization.

4. The system of claim 1, wherein the input following the "in" operator for the member process component is each note candidate member in the generated member list.

5. The system of claim 1, wherein the input following the "in" operator for the temporary table process component is a temporary table.

6. The system of claim 5, further comprising program code to cause the system to:
- generate the temporary table, wherein the temporary table includes each note candidate member in the generated member list.

7. The system of claim 1, wherein the input following the "in" operator for the passing-back process component is the member list instruction.

8. The system of claim 1, wherein a database executes the SQL path statement.

9. The system of claim 1, wherein determination of the path component is based on a comparison of the determined volume of the member list to a plurality of threshold levels.

10. A computer-implemented method comprising:
- generating a first visualization based on a model;
- receiving a note on a first visualization data element;
- storing the received note with a path;
- generating a second visualization based on the model, the second visualization including a second visualization data element corresponding to the first visualization data element;
- generating, via execution of a member list instruction, a member list of note candidate members;
- determining a volume of note candidate members in the member list;
- selecting a path component based on the determined volume, wherein the path component is one of a member process component, a temporary table process component and a passing-back process component, wherein the path component determines an input following an "in" operator of a SQL path statement;
- executing the selected path component and outputting the path for each note candidate member in the generated member list; and
- rendering the note on the second visualization in a case the path for a first note candidate member in the generated member list matches the path stored with the received note.

11. The computer-implemented method of claim 10, wherein the input following the "in" operator in the member process component is each note candidate member in the generated member list.

12. The computer-implemented method of claim 10, wherein the input following the "in" operator for the temporary table process component is a temporary table.

13. The computer-implemented method of claim 10, wherein the input following the "in" operator for the passing-back process component is the member list instruction.

14. The computer-implemented method of claim 10, wherein determination of the path component is based on a comparison of the determined volume of the member list to a plurality of threshold levels.

15. One or more non-transitory computer-readable recording media storing program code, the program code executable by at least one processing unit of a computing system to cause the computing system to perform operations comprising:
- generating a first visualization based on a model;
- receiving a note on a first visualization data element;
- storing the received note with a path;
- generating a second visualization based on the model, the second visualization including a second visualization data element corresponding to the first visualization data element;
- generating, via execution of a member list instruction, a member list of note candidate members;
- determining a volume of note candidate members in the member list;

selecting a path component based on the determined volume, wherein the path component is one of a member process component, a temporary table process component and a passing-back process component, wherein the path component determines an input following an "in" operator of a SQL path statement;

executing the selected path component and outputting the path for each note candidate member in the generated member list; and rendering the note on the second visualization in a case the path for a first note candidate member in the generated member list matches the path stored with the received note.

16. The media of claim 15, wherein determination of the path component is based on a comparison of the determined volume of the member list to a plurality of threshold levels.

* * * * *